(12) United States Patent
Angell et al.

(10) Patent No.: US 7,365,300 B2
(45) Date of Patent: Apr. 29, 2008

(54) REAR VISION SYSTEM

(75) Inventors: Daniel K. Angell, Allen Park, MI (US); Michael J. Luettgen, Bloomfield Hills, MI (US); Matthew M. Mikolajczak, Novi, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 21 days.

(21) Appl. No.: 11/169,435

(22) Filed: Jun. 29, 2005

(65) Prior Publication Data

US 2007/0001095 A1     Jan. 4, 2007

(51) Int. Cl.
*H01L 27/00* (2006.01)
(52) U.S. Cl. .................. 250/208.1; 250/216; 348/148; 348/118; 348/333.05; 340/937; 340/426.23
(58) Field of Classification Search ............. 250/208.1; 348/118, 148, 333.05; 340/426.23, 461, 340/937
See application file for complete search history.

(56) References Cited

U.S. PATENT DOCUMENTS

| | | | |
|---|---|---|---|
| 3,187,628 A | 6/1965 | Canns et al. | |
| 4,968,124 A | 11/1990 | Deckert et al. | |
| 5,414,461 A | 5/1995 | Kishi et al. | |
| 5,670,935 A * | 9/1997 | Schofield et al. | 340/461 |
| 5,708,847 A * | 1/1998 | Kimura et al. | 710/20 |
| 5,756,988 A * | 5/1998 | Furuta | 250/208.1 |
| 5,949,331 A | 9/1999 | Schofield et al. | |
| 6,046,766 A * | 4/2000 | Sakata | 348/148 |
| 6,101,048 A | 8/2000 | Wheeler | |
| 6,151,065 A | 11/2000 | Steed et al. | |
| 6,166,764 A * | 12/2000 | Sakata | 348/148 |
| 6,184,781 B1 | 2/2001 | Ramakesavan | |
| 6,222,447 B1 | 4/2001 | Schofield et al. | |
| 6,320,612 B1 | 11/2001 | Young | |
| 6,400,405 B2 | 6/2002 | Tomida et al. | |
| 6,472,995 B2 | 10/2002 | Imoto | |
| 6,476,855 B1 * | 11/2002 | Yamamoto | 348/148 |
| 6,498,620 B2 | 12/2002 | Schofield et al. | |
| 6,611,202 B2 | 8/2003 | Schofield et al. | |
| 6,621,072 B2 * | 9/2003 | Imoto | 250/239 |
| 6,657,176 B2 * | 12/2003 | Mishima et al. | 250/208.1 |
| 6,693,519 B2 | 2/2004 | Keirstead | |
| 6,738,089 B1 | 5/2004 | Silc | |
| 6,788,478 B2 * | 9/2004 | Imoto | 359/831 |
| 7,031,142 B2 * | 4/2006 | Mishima et al. | 361/679 |
| 7,253,833 B2 * | 8/2007 | Imoto | 348/148 |
| 2002/0075387 A1 | 6/2002 | Janssen | |
| 2002/0175832 A1 | 11/2002 | Mizusawa et al. | |
| 2003/0122930 A1 | 7/2003 | Schofield et al. | |
| 2004/0051634 A1 | 3/2004 | Schofield et al. | |
| 2005/0018323 A1 | 1/2005 | Breslin | |
| 2006/0038884 A1 * | 2/2006 | Ma | 348/118 |

* cited by examiner

*Primary Examiner*—Thanh X. Luu
*Assistant Examiner*—Stephen Yam
(74) *Attorney, Agent, or Firm*—Brinks Hofer Gilson & Lione

(57) ABSTRACT

A rear vision system having a divided lens configuration and sensor array. The sensor array has a first, second section and third sections. The lens configuration includes a first portion directing a first field of view onto the first section of the sensor array, and a second portion directing a second field of view onto the second section of the sensor array. The sensor array may be a complementary metal oxide semiconductor camera or a charge coupled device camera.

15 Claims, 2 Drawing Sheets

REAR VISION SYSTEM

BACKGROUND

1. Field of the Invention

The present generally relates to multiview display systems and more particularly to multiview display systems used in automobiles

2. Description of the Known Technology

Larger automobiles, such as sport utility vehicles, are sometimes equipped with vehicle rear vision systems to enhance the rearward view of the driver. These rear vision systems typically have a single camera capable of viewing the environment directly behind the vehicle. The camera sends the display information to a viewing device located inside the passenger compartment of the vehicle such that the driver of the vehicle can see the viewing device. This solution has the drawbacks of only being able to display the environment directly behind the vehicle and not the environment to the left or the right of the rear of the vehicle.

One solution to this problem is the placement of three cameras. The first camera is positioned such that it can view the environment directly behind the vehicle. A second and third camera are placed such that they can view the environment directly to the right and the left of the rear of the vehicle. However, this solution has the drawback of the additional expense of requiring three cameras and the associated electronics, mounting hardware and cabling.

Therefore, it is desirable to provide a cost effective solution that provides a view of the environment behind the vehicle and to the left and the right of the rear of the vehicle through the use of only one camera.

SUMMARY

In overcoming the drawbacks and limitations of the known art, the present invention provides a rear vision system having a sensor array having a first section, a second section, and a third section and a lens configuration having a first portion directing a first field of view onto the first section of the sensor array, a second portion directing a second field of view onto the second section of the sensor array and a third portion directing a third field of view onto the third section of the sensor array. The first portion of the lens configuration will preferably be a first wall having an opening defined therein. Within the opening, there is a lens that is preferably made of plastic but may be made of glass.

The second and third portion of the lens configuration includes a first and second reflective wall each having a first side having a reflective surface. The first and second reflective walls are positioned adjacent to the first wall and are angled with respect to the sensor array by a first specified angle. The specified angle is approximately 45° but may vary from about 30° to about 60°.

The system may further include a first and second side walls having openings defined therein. The first and second side walls are adjacent to the first and second reflective walls respectively and are positioned perpendicular to the sensor array. Within the opening of the first and second side walls is a lens preferably made of plastic but may be made of glass.

The sensor array is either a complementary metal oxide semiconductor camera or a charge coupled device camera. Connected to the sensor array is an electronic system which is in turn connected to a display device. The electronic system is capable of displaying the first, second and third field of view simultaneously or may display any combination thereof.

These and other advantages, features and embodiments of the invention will become apparent from the drawings, detailed description and claims, which follow.

DETAILED DESCRIPTION

Figure 1:
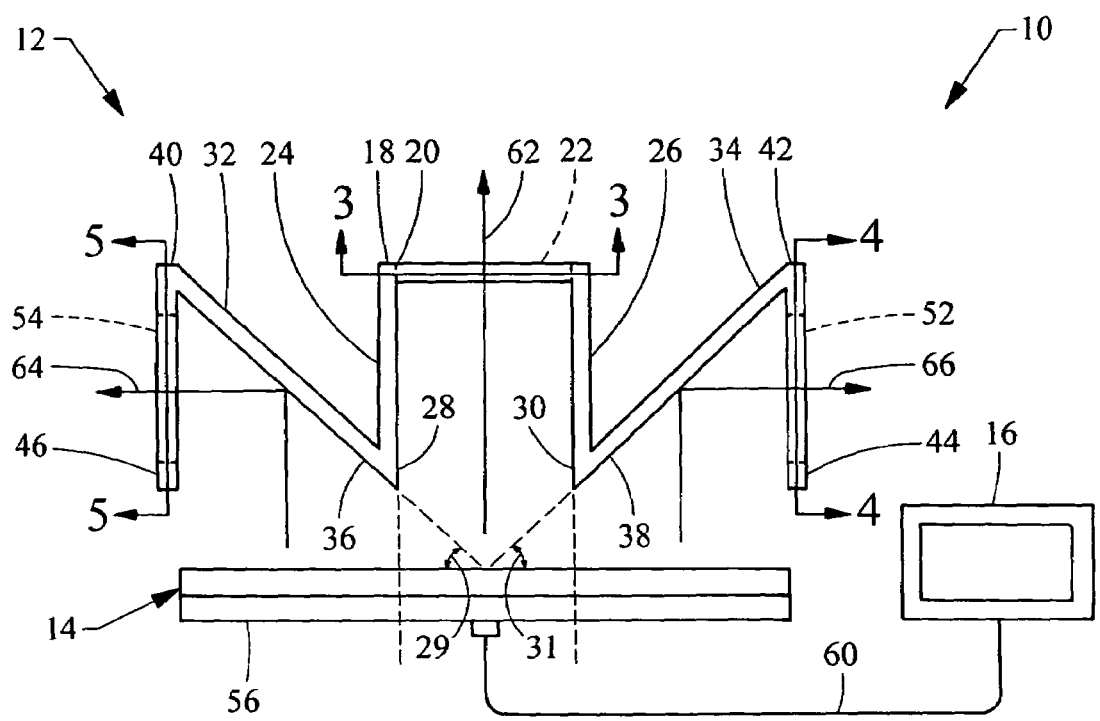
FIG. 1 is a view of the rear vision system embodying the principles of the present invention.
Figure 3:
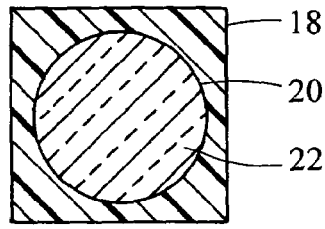
FIG. 3 is a view of the rear vision system, generally along lines 2-2 and embodying the principles of the present invention.
Figure 2:
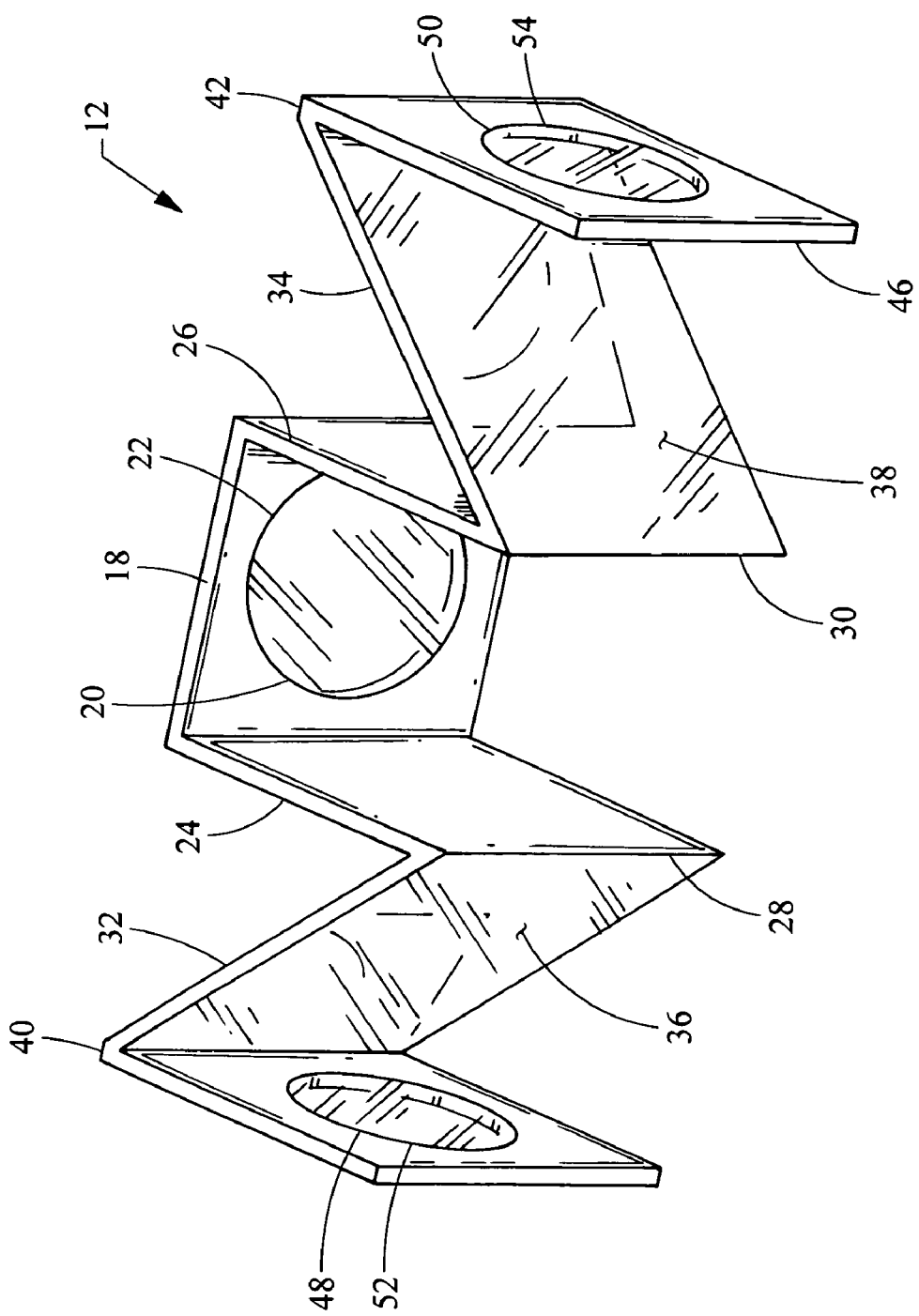
FIG. 2 is a perspective view of the lens configuration of the rear vision system embodying the principles of the present invention.

Referring now to FIGS. 1 and 2, a rear vision system 10 having a lens configuration 12, a sensor array 14 and a display device 16 is shown. The lens configuration 12 includes a first wall 18 having an opening 20 defined within. Placed within the opening 20 is a first lens 22, preferably held within the opening 20 by frictional engagement. However, the first lens 22 may be held within the opening 20 by an adhesive or any other suitable means. Preferably, the lens is made of plastic but may be made of glass.

Fixedly attached to opposing ends of the first wall 18 are a second wall 24 and a third wall 26. Preferably, the second wall 24 and the third wall 26 are substantially perpendicular to the first wall 18. Fixedly attached to the respective ends 28, 30 of the second wall 24 and the third wall 26 are a first reflective wall 32 and a second reflective wall 34 having reflective sides 36, 38. These reflective sides 36, 38 of the first and second reflective walls 32, 34 may be mirrors. The second and third walls 24 are angled back from the ends 28, 30 such that the first and second reflective sides 32, 34 define an angle of approximately 45° between first and second reflective sides 36, 38 and the sensor array 14 as shown by angles 29, 31 respectively. However, the angles 29, 31 between the reflective sides 36, 38 and the sensor array 14 may vary from about 30° to about 60°.

Fixedly attached to ends 40, 42 of the first and second reflective walls 32, 34, are a first side wall 44 and a second side wall 46, respectively. The first and second side walls 44, 46 extend from the reflective walls 32, 34 at an angle such that they are generally perpendicular to the sensor array 14.

Figure 4:
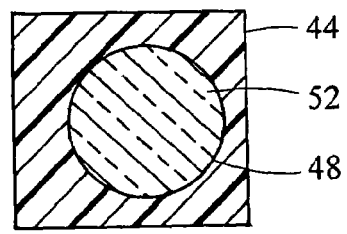
FIG. 4 is a view of the rear vision system, generally along lines 3-3 and embodying the principles of the present invention.
Figure 5:
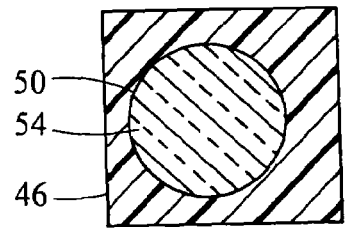
FIG. 5 is a view of the rear vision system, generally along lines 4-4 and embodying the principles of the present invention.

Referring now to FIGS. 4 and 5, the first and second side walls 44, 46 have openings 48, 50 defined within. The openings 48, 50 preferably have lens 52, 54 held therein by frictional engagement, the use of an adhesive or other means. While preferably made of plastic, the lenses may be made of glass.

The sensor array 14 is preferably either a complementary metal oxide semiconductor camera (CMOS) or a charge coupled device (CCD) camera. Since these are well known technologies and their specific workings not required for an understanding of the present invention, further detail thereon is not provided herein. However, the sensor array may be another known variety of vision system or of a variety hereinafter developed. In electrical communication with the sensor array 14 is an electronic system 56. The electronic system 56 receives signals from the sensor array 14 and communicates to a display device 16 by way of a cable 60. Alternatively, the electronic system may communicate to the display device 16 via wireless signal.

The electronic system 56 is capable of discerning different portions of the sensor array 14 and correspondingly displaying a first field of view (as indicated by arrow 62), a second field of view discerning different portions of the sensor array and correspondingly (as indicated by second arrow 64) arid a third field of view (as indicated by third arrow 66) to the display device 16 via the cable 60. Alternatively, depending on the angling of the reflective surfaces 36, 38 with respect to the sensor array 14, the first, and second fields of view may overlap. The electronic system may communicate to the display device 60 to display simultaneously the first, the second and the third fields of view or may display any combination thereof.

As a person skilled in the art will readily appreciate, the above description is meant as an illustration of implementation of the principles this invention. This description is not intended to limit the scope or application of this invention in that the invention is susceptible to modification, variation and change, without departing from the spirit of this invention, as defined in the following claims.

The invention claimed is:

1. A rear vision system comprising:
   a sensor array having a first, second and third sensor sections;
   a lens configuration having a first portion directing a first field of view onto the first sensor section, a second portion directing a second field of view onto the second sensor section, and a third portion directing a third field of view onto the third sensor section;
   the first sensor section located entirely between the second and third sensor sections;
   the first portion of the lens configuration includes a first wall having a viewing opening defined therein;
   the second portion of the lens configuration includes a second wall with a viewing opening defined therein, the second wall being fixedly attached to and directly adjacent to the first wall;
   the second portion of the lens configuration includes a reflective wall including a reflective surface, the reflective wall being fixedly attached to and directly adjacent to the second wall and angled with respect to the sensor array.

2. The rear vision system of claim 1, wherein the plurality of sensor portions corresponds in number to portions of the lens configuration defining different fields of view.

3. The rear vision system of claim 1, wherein the first and second fields of view overlap one another.

4. The rear vision system of claim 1, wherein the first and second fields of view do not overlap one another.

5. The system of claim 1, wherein the third portion of the lens configuration includes a third wall with a viewing opening therein, the third wall being fixedly attached to and directly adjacent to the first wall, the third portion also having a reflective wall including a reflective surface, the reflective wall being fixedly attached to and directly adjacent to the first wall and angled with respect to the sensor array.

6. The system of claim 5, wherein the angling of the reflective surfaces with regard to the sensor array are substantially the same.

7. The system of claim 5, wherein the angling of the reflective surfaces is in the range of about 30 degrees to 60 degrees.

8. The system of claim 5, wherein the angling of the reflective surfaces is about 45 degrees.

9. The system of claim 1, further comprising;
   a first lens positioned within the viewing opening of the first wall; and
   a second lens positioned within the viewing opening of the second wall.

10. The system of claim 9, wherein the lens is a plastic lens.

11. The system of claim 9, wherein the lens is a glass lens.

12. The system of claim 1, wherein the reflective surface of the second portion is a mirror.

13. The system of claim 1, wherein the sensor array is a complementary metal oxide semiconductor camera.

14. The system of claim 1, wherein the sensor army is part of a charge coupled device camera.

15. The system of claim 1, further comprising an electronic system and a display device, whereby the electronic system is configured to display at least one of the first field of view, the second field of view and the third field of view on the display device.

* * * * *

UNITED STATES PATENT AND TRADEMARK OFFICE
CERTIFICATE OF CORRECTION

PATENT NO.        : 7,365,300 B2
APPLICATION NO. : 11/169435
DATED             : April 29, 2008
INVENTOR(S)      : Daniel K. Angell et al.

It is certified that error appears in the above-identified patent and that said Letters Patent is hereby corrected as shown below:

<u>In the Claims</u>

Column 4, line 38, after "wherein the sensor" delete "army" and substitute --array-- in its place.

Signed and Sealed this

Fourteenth Day of October, 2008

JON W. DUDAS
*Director of the United States Patent and Trademark Office*